United States Patent [19]

Uchidoi et al.

[11] 4,020,433
[45] Apr. 26, 1977

[54] RELEASE TYPE ELECTROMAGNETIC DEVICE

[75] Inventors: Masanori Uchidoi, Kawasaki; Hideaki Miyakawa, Inagi; Tetsuya Taguchi, Kawasaki; Yukio Mashimo, Tokyo; Satoshi Watanabe, Inagi, all of Japan

[73] Assignee: Canon Kabushiki Kaisha, Japan

[22] Filed: Jan. 7, 1975

[21] Appl. No.: 539,048

[30] Foreign Application Priority Data

Jan. 18, 1974 Japan .............................. 49-8308

[52] U.S. Cl. .............................. 335/230; 335/234
[51] Int. Cl.² .......................................... H01F 7/08
[58] Field of Search ................... 335/229, 230, 234

[56] References Cited
UNITED STATES PATENTS

| 2,876,397 | 3/1959 | Wasson | 335/230 |
| 2,915,681 | 12/1959 | Troy | 335/229 X |
| 3,016,479 | 1/1962 | Coley | 335/230 |
| 3,302,146 | 1/1967 | Zocholl | 335/230 |

*Primary Examiner*—George Harris
*Attorney, Agent, or Firm*—McGlew and Tuttle

[57] ABSTRACT

The device includes a permanent magnet for attracting a movable iron armature. A pair of elongated rectilinear magnetic bodies have planar pole faces at one end facing the iron armature, and the permanent magnet is sandwiched between these two magnetic members intermediate their ends, with the permanent magnet extending perpendicularly to the magnetic members. Respective magnetizing windings embrace each magnetic member between the permanent magnet and the pole faces of the members, to produce a magnetic flux in the magnetic members opposing the flux provided by the permanent magnet so as to release the iron armature. In one embodiment of the invention, the other ends of the members, projecting beyond the permanent magnet, are angled to face each other to provide an air gap therebetween. In a second embodiment of the invention, the magnetic members or yokes have respective second windings thereon, beyond the permanent magnet, and the ends of these yokes, beyond the second windings, are formed with planar pole faces for operative association with a second iron armature. Both iron armatures are spring biased to disengage the magnetic yokes or members. As the permanent magnet engages the yokes intermediate their ends, the magnetic flux path due to the magnetizing windings does not include the permanent magnet and therefore an effective armature releasing magnetic flux can be provided with only a relatively small current supplied to the magnetizing windings.

8 Claims, 9 Drawing Figures

FIG.1 PRIOR ART
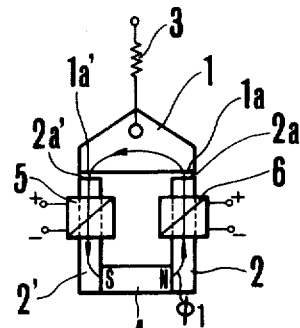
FIG.2a
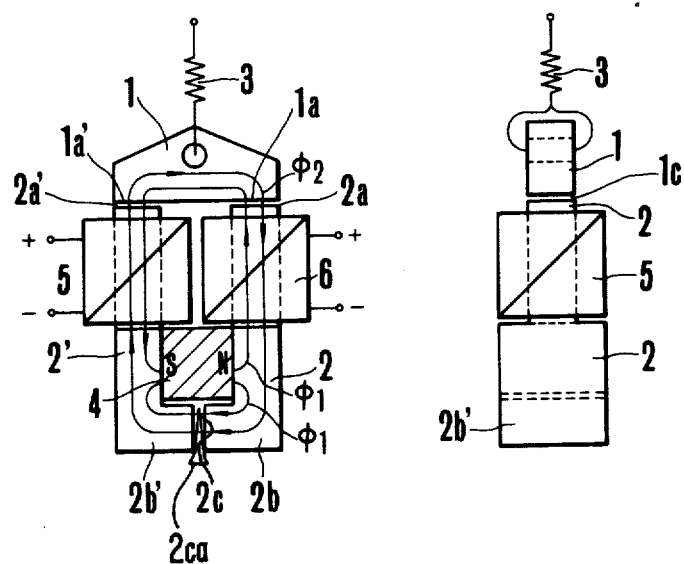
FIG.2b
FIG.2c
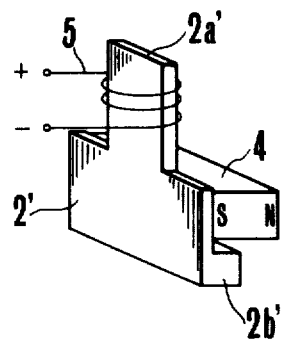

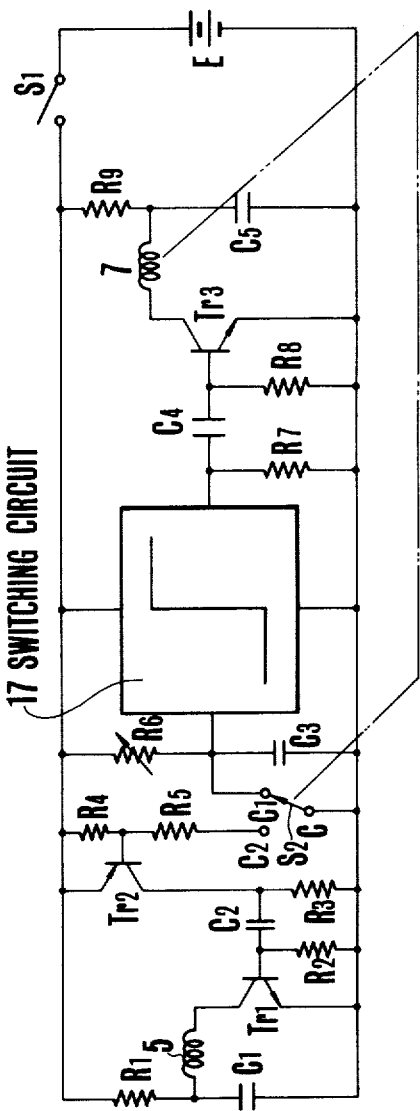
F I G. 5

RELEASE TYPE ELECTROMAGNETIC DEVICE

BACKGROUND OF THE INVENTION

1. Field of the Invention

The present invention relates to an electromagnetic device, especially to a release type electromagnetic device including a permanent magnet for attracting a movable iron armature and exciting coils for providing a magnetic flux opposing the flux of the permanent magnet, in order to release the iron armature.

2. Description of the Prior Art

As a release type electromagnetic device in the prior art, a device as shown in FIG. 1 has been proposed. In this device, a movable iron armature 1 is attracted by the magnetic flux $\phi_1$ generated by a permanent magnet 4, and a magnetic flux $\phi_2$ is generated by supplying current to exciting coils 5, 6, for releasing movable iron armature 1 by the magnetic flux $\phi_2$. However, in the case of such device, since the magnetic flux $\phi_2$ generated by the coils 5, 6 forms a closed magnetic circuit through the permanent magnet 4, which has very large magnetic reluctance, it is reduced in strength. Thus the current to be supplied to the coils 5, 6, for releasing the magnetic pole faces 1a, 1a' of the movable iron armature 1 from the magnetic pole faces 2a, 2a' of the yokes 2, 2' has to be very large in magnitude in the case of such conventional device.

SUMMARY OF THE PRESENT INVENTION

An object of the present invention is to provide a release type electromagnetic device in which only a small magnitude current is needed to release the movable iron armature.

Another object of the present invention is to provide a release type electromagnetic device comprising a permanent magnet to attract a movable iron piece, a yoke to form the magnetic path for the magnetic flux of the permanent magnet, an exciting coil wound around the yoke to generate the magnetic flux to negate the magnetic flux from the permanent magnet, and a magnetic body or yoke to form closed magnetic circuit for the magnetic flux of the coil together with the above mentioned yoke and the movable iron armature, a closed magnetic circuit for the magnetic flux of the coil.

Further objects of the present invention will become apparent by the following descriptions which are made with reference to the drawing.

BRIEF DESCRIPTION OF THE DRAWINGS

FIG. 1 is a front elevation of a conventional type release type electromagnetic device.

FIG. 2a is a front elevation of a first example of the release type electromagnetic device of the present invention.

FIG. 2b is a side elevation of the example shown in FIG. 2a.

FIG. 2c is an oblique view showing a portion of the device shown in FIG. 2a.

FIG. 3a and FIG. 3b are equivalent circuit diagrams for the device shown in FIG. 2a.

FIG. 4b is a side elevation of the device shown in FIG. 4a.

FIG. 5 shows an example of an exposure control circuit of a single lens reflex camera which employs the device of the present invention.

DESCRIPTION OF THE PREFERRED EMBODIMENTS

Figure 3A:
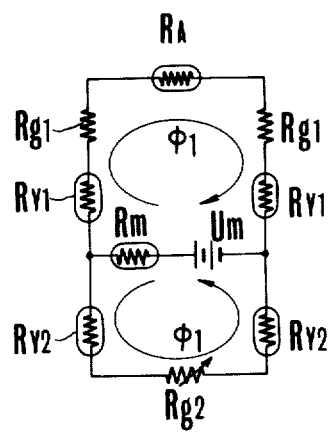

FIGS. 2a, 2b illustrate important structural parts of the first example of the device according to the present invention. For elements which are the same as those in the conventional device shown in FIG. 1, the same identification marks and numbers will be used and explanations thereof will be omitted. In FIGS. 2a and 2b 1 is a movable iron armature having planar faces 1a, 1a' which contact the magnetic pole faces 2a, 2a' of yokes 2 and 2', respectively, formed by elongated rectilinear pieces of magnetic materials such as Permalloy, electromagnetic mild iron, etc. having less magnetic reluctance than that of the permanent magnet 4. A spring 3 biases iron armature 1 in a direction to disengage planar faces 1a, 1a' away from the magnetic pole faces 2a, 2a' of yokes 2 and 2'. A permanent magnet 4 is magnetized to form an N pole and a S pole, as shown in the drawings, and is sandwiched between yokes 2 and 2', intermediate their ends, with its magnetic axis extending perpendicularly to the length of the yokes 2, 2'. Projection parts 2b, 2b', of yokes 2, 2', extend toward each other in slightly spaced relation to the lower surface of permanent magnet 4, as shown in FIG. 2a. A closed magnetic circuit for the magnetic flux due to current flowing through the coils 5, 6 is formed by projection parts 2b, 2b', the yokes 2, 2' and the movable iron armature 1. Further, the end faces of the projection parts 2b, 2b' are separated from each other to adjust the magnetic reluctance of the above mentioned closed magnetic circuit. The magnetic reluctance of the closed magnetic circuit may be adjusted for example, by pieces of magnetic material 2ca having a prescribed permeability and inserted in an air gap 2c formed by projection parts 2b, 2b' and for this purpose one of the projection parts 2b, 2b' may be slotted as indicated by the dotted line in FIG. 2b. The code 5, 6 are wound around the yokes 2, 2', respectively, and one end of each of the coils is connected to the (+) terminal and the other end to (−) terminal of a power source (not shown in the drawing).

Figure 3B:
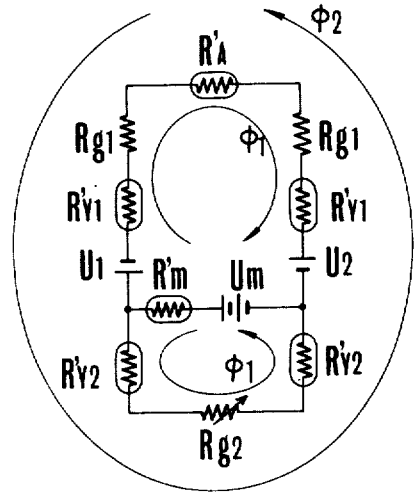

An explanation of the operation of the device just described will now be made with reference to FIG. 3a and FIG. 3b. FIG. 3a is an equivalent circuit diagram of an electromagnetic device in such state when current is not flowing to the coils 5, 6 and the movable iron armature 1 is attracted onto the yokes 2, 2' by the magnetic flux $\phi_1$ from the permanent magnet 4 resisting the force of the spring 3, and FIG. 3b is an equivalent circuit diagram of the electromagnetic device in the state when current is supplied to the coils 5, 6 to generate the magnetic flux $\phi_2$ having a direction opposite to that of the magnetic flux $\phi_1$ provided by the permanent magnet 4. In FIG. 3a, $R_A$ is the magnetic reluctance of the movable iron armature 1, and $Rg_1$ is the magnetic reluctance of the air gap between the movable iron armature 1 and the yokes 2, 2', while $Ry_1$ is the magnetic reluctance of the yokes 2, 2', and $Ry_2$ is the magnetic reluctance of the projection parts 2b, 2b'. $Rg2$ is the magnetic reluctance of the air gap 2c, and $Um$ indicates the magnetic-motive force of the permanent magnet 4, while $Rm$ is the magnetic reluctance of the permanent magnet. In FIG. 3b, $RA'$ is the magnetic reluctance of the movable iron armature 1, and $Rm'$ is the magnetic reluctance of the permanent magnet 4, while $Ry_1'$ is the magnetic reluctance of the yokes 2, 2' also, $Ry_2'$ is the magnetic reluctance of the projection parts $2b$, $2b'$, and $U_1$ indicates the magnetic-motive force generated by the current flowing to the coil 5, while $U_2$ indicates the magnetic-motive force generated by the current flowing to the coil 6. Those magnetic reluctances having the same value as shown in FIG. 3a will be identified by same marks and figures as in FIG. 3a, and explanations thereof are omitted.

Now, when current is not supplied to the coils 5, 6, the magnetic flux $\phi_1$ from the permanent magnet 4 passes through the yoke 2, the movable iron armature 1 and the yoke 2'. Therefore, the movable iron armature 1 is attracted onto the yokes 2, 2' against the force of the spring 3. The equivalent circuit at that time will be as shown in FIG. 3a. When current is supplied to the coils 5, 6 to generate the magnetic flux $\phi_2$ having a direction opposite to the direction of the magnetic flux from the permanent magnet 4 passing through movable iron armature 1, magnetic flux $\phi_2$ passes through a closed magnetic circuit which consists of the yoke 2' of a magnetic material, the movable iron armature 1, the yoke 2 of a magnetic material, a projection part $2b$ of the yoke 2, the gap $2c$ within which air, as a non-magnetic body is present and the projection part $2b'$ of the yoke 2'. Therefore the magnetic flux $\phi_1$ is weakened by the magnetic flux $\phi_2$, and the magnetic iron piece 1 is moved upward by the spring 3.

To give further detailed explanations on this point, the attracting power $F_2$ (refer to FIG. 3b) between the movable iron armature 1 and the yokes 2, 2' is expressed by the following equation:

$$F_2 = \frac{(\phi_1 - \phi_2)^2}{2\mu_o \cdot S} \times 2 - F \qquad (1)$$

(In the above equation, $F$ expresses the tensile power of the spring 3, $\mu_o$ expresses the permeability, $\phi_1$ expresses magnetic flux furnished by the permanent magnet, $\phi_2$ represents the magnetic flux furnished by the coils 5, 6, and S indicates the area of contact between the movable iron armature 1 and the yokes 2, 2').

Therefore, when the attracting force $F_2$ becomes $F_2 < 0$, that is, as the effective magnetic flux decreases to a certain prescribed value, the movable iron armature 1 is released.

As has been explained above, in the present invention, the magnetic flux $\phi_2$ passes through the magnetic path formed by the member $2b$, $2b'$, $2c$ having smaller magnetic reluctance than the magnetic reluctance of the permanent magnet 4. Thus the movable iron armature 1 can be released from the yokes 2, 2' with a smaller magnetic-motive force. In other words, a closed magnetic circuit with small magnetic reluctance for the magnetic flux of the coils 5, 6 is formed by the armature 1, the yokes 2, 2' and the projection parts $2b$, $2b'$ of the yokes 2, 2' in the present invention. The effect is that the current to be supplied to the coils 5, 6 for releasing armature 1 can have a small magnitude.

In the following description of the second example of the release type electromagnetic device of the present invention, those elements the same as those in the device shown in FIG. 2a are identified the with same reference characters and explanations thereof will be omitted. In this second example, two movable iron armature 1, 9 are provided at respective opposite ends of the yokes 2, 2', with armature 1 being controlled by the coils 5, 6 while armature 9 is controlled by the coils 7, 8. Of course, in this example also, the magnetic flux generated by the coils 5, 6 passes through a closed magnetic circuit having small magnetic reluctance, that is the closed magnetic circuit consisting of the yoke 2' — the armature 1 — — the yoke 2 — the armature 9 — the yoke 2', to release armature 1 from the yokes 2, 2'.

Figure 4A:
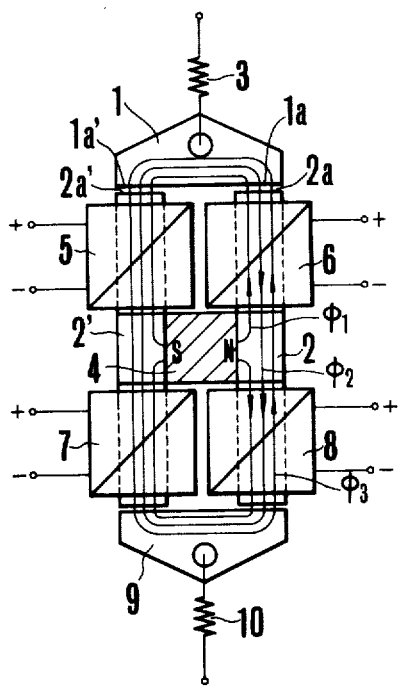
FIG. 4a is a front elevation of a second example of the present invention.

The operation of the device shown in FIG. 4a will now be explained.

Figure 4B:
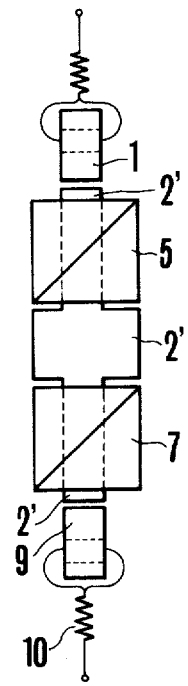

First, when current is not supplied to the coils 5, 6, the movable armature 1, 9 are attracted onto the yokes 2, 2' by the magnetic flux $\phi_1$ from the permanent magnet 4. Next, as current is supplied to the coils 5, 6, a magnetic flux $\phi_2$ having a direction opposite to that of the magnetic flux $\phi_1$ generated from permanent magnet 4 is generated, as shown in the drawing, by now energized coils 5, 6. Thus the attracting power between the movable armature 1 and the magnetic pole forces $2a$, $2a'$ will be weakened, and the armature 1 is moved upward by the spring 3 and thus disengaged from the yokes 2, 2'. At this time, since $\phi_2$ is a magnetic flux having a direction such as to attract armature 9, armature 9 remains attracted to the other ends of the yokes 2, 2'. Now, as current is supplied to the coils 7, 8 and a magnetic flux $\phi_3$ as, shown in the drawing, is generated, since magnetic flux $\phi_3$ has a direction opposite to that of the magnetic flux $\phi_2$, the attracting power between armature 9 and the yokes 2, 2' is reduced and eventually the movable armature 9 is released from the yokes 2, 2' by the spring 10. FIG. 5 illustrates the switching circuit of a single lens reflex camera using the device shown in FIG. 4a. In FIG. 5, $R_6$ is a resistance having resistance value corresponding to shutter speed, $C_3$ is a capacitor forming a time constant circuit with the resistance $R_6$, and 17 is a switching circuit, such as a Schmidt circuit, connected to the output terminal of the above mentioned time constant circuit. A resistance $R_7$ is connected between the output terminal of the switching circuit 17 and the negative terminal of a power source E. A capacitor $C_4$ and a resistance $R_8$ form a differential circuit. An npn type transistor $T_{R3}$ has its base connected to one end of resistance $R_8$, while collector is connected to the (−) terminal of the coil 7 shown in FIG. 4. In this case, the coils 6, 8 shown in FIG. 4a are omitted. The (+) terminal of the coil 7 is connected to the output terminals of the resistance $R_9$ and the capacitor $C_5$ which form an integration circuit. Further, the movable armature 9 is coupled with a member (not shown in the drawing) for releasing the hold of the rear screen of the camera. A change over switch $S_2$ has fixed contacts $C_1$, $C_2$ and a movable contact C. $Tr_2$ is a pnp type transistor and resistances $R_4$, $R_5$ form a bleeder circuit, and the output terminal of the bleeder circuit is connected to the base of the above mentioned transistor $Tr_2$. A resistor $R_3$ connects the collector of transistor $Tr_2$ to the negative terminal of source E, and a capacitor $C_2$ and a resistance $R_2$ form a differential circuit, whose output terminal is connected to the base of the switching transistor $Tr_1$. The input terminal of the differential circuit is connected to the collector of the above mentioned transistor $Tr_2$. A coil 5 is wound around the yoke 2' as shown in FIG. 4a, and the (−) terminal of coil 5 is connected with the collector of the above mentioned transistor $Tr_1$, while the (+) terminal thereof is connected with one end of the capacitor $C_1$ which forms an integration circuit. A power source switch $S_1$ has its movable contact connected with the positive terminal of the power source E and, when closed energized the circuitry. Also the armature 1 is connected to a member (not shown in the drawing) for releasing the hold on the front screen (not shown in the drawing) of a shutter.

The operation of a camera having the circuitry of FIG. 5 will now be explained.

First, when the change over switch $S_2$ is changed over from the fixed contact 1 to fixed contact 2, the base potential of transistor $Tr_2$ becomes lower than its emitter potential due to the current flow through to the resistances $R_4$, $R_5$, so that transistor $Tr_2$ becomes ON. As a result, capacitor $C_2$ is instantaneously charged, and transistor $Tr_1$ becomes ON for a length of time as determined by the time constant factor of the circuit $C_2$, $R_2$. As the transistor $Tr_1$ becomes ON, the charge of capacitor $C_1$ which has been charged beforehand through resistor $R_1$ is, discharged in pulse form through the electromagnetic coil 5, and movable armature 1 is separated from the yokes 2, 2′, while the front screen of the shutter runs and exposure is started. At the same time when the switch $S_2$ is changed over to the contact 2, the capacitor $C_3$ of the time constant circuit is charged through the resistance $R_6$, for shutter speed setting, from the power source E, and after an elapse of a period of time as determined by the time constant factor of the circuit $R_6$, $C_3$, the switching circuit 17 is reversed and the transistor $Tr_3$ becomes ON by the output thereof after a period of time corresponding to the shutter speed set at the resistance $R_6$. As transistor $Tr_3$ becomes ON the, charge of capacitor $C_5$ which has been accumulated beforehand through resistor $R_9$, is discharged in pulse form through the coil 7 of the electromagnetic device. As a result, the armature 9 is released and the shutter rear screen runs to complete exposure. If the electromagnetic device of the present invention is applied to an exposure control device of a camera, the current necessary to be supplied to the coils 5, 7 has a small magnitude. Further, only a momentary current supply will be sufficient, so that the consumption of the power source can be greatly reduced.

While specific embodiments of the invention have been shown and described in detail to illustrate the application of the principles of the invention, it will be understood that the invention may be embodied otherwise without departing from such principles.

What is claimed is:

1. A release type electromagnetic device comprising, in combination, two relatively elongated, substantially rectilinear pole pieces arranged in spaced substantially parallel relation; a permanent magnet positioned between said pole pieces and having its magnetizing direction substantially perpendicular to the longitudinal extent of said pole pieces; a normally deenergized electromagnetic means operatively associated with said pole pieces and operable, when energized, to generate a magnetic flux opposing the magnetic flux of said permanent magnet; a movable magnetizable armature adjacent corresponding first ends of said pole pieces, forming pole faces, and normally attracted against said pole faces by the flux of said permanent magnet when said electromagnetic means is deenergized; spring means biasing said armature to disengage said pole faces; and means forming a magnetizable flux path adjacent said permanent magnet and opposing the flux path including said permanent magnet and said armature; said magnetizable flux path forming means, said pole pieces and said armature forming a closed magnetic circuit for the flux of said electromagnetic means, said closed magnetic circuit by-passing said permanent magnet.

2. A release type electromagnetic device, according to claim 1, in which said closed magnetic circuit includes a member having a smaller magnetic reluctance than the magnetic reluctance of said permanent magnet.

3. A release type electromagnetic device, according to claim 1, in which said magnetizable flux path has a magnetic resistance less than the magnetic resistance of said permanent magnet.

4. A release type electromagnetic device, according to claim 1, in which said electromagnetic means includes coil means wound on said pole pieces.

5. A release type electromagnetic device, according to claim 1, in which said closed magnetic circuit includes magnetic flux adjusting means operable to adjust the amount of magnetic flux from said electromagnetic means.

6. A release type electromagnetic device, according to claim 1, in which said permanent magnet is positioned between said pole pieces intermediate the ends of said pole pieces, so that said pole pieces have second ends extending beyond said permanent magnet in a direction opposite to the extend of said first ends from said permanent magnet; said electromagnetic means comprising coil means on said pole pieces between said permanent magnet and said first ends of said pole pieces; said second ends of said pole pieces constituting projections from said permanent magnet and forming part of the closed magnetic circuit, for the flux of said electromagnetic means, by-passing said permanent magnet.

7. A release type electromagnetic device, according to claim 6, in which said second ends of said pole pieces are bent toward each other to define an air gap therebetween.

8. A release type electromagnetic device, according to claim 1, in which said permanent magnet is positioned between said pole pieces intermediate the ends of said pole pieces; said pole pieces having corresponding second ends forming second pole faces; a second movable magnetizable armature adjacent said corresponding second ends of said pole pieces and normally attracted against said second pole faces by the flux of said permanent magnet when said electromagnetic means is deenergized; second spring means biasing said second armature to disengage said second pole faces; said electromagnetic means comprising first coil means wound on said pole pieces between said permanent magnet and said first ends thereof, and second coil means wound on said pole pieces between said permanent magnet and said second ends thereof; said second coil means being operable, when energized, to generate a magnetic flux opposing the magnetic flux of said permanent magnet exerted on said second armature; whereby two closed magnetic circuits for the flux of said electromagnetic means are formed in by-passing relation with said permanent magnet, one closed magnetic circuit including said pole pieces, said second armature, said first coil means and said first armature, and the other closed magnetic circuit including said pole pieces, said first armature, said second coil means and said second armature.

* * * * *